(12) United States Patent
Clark et al.

(10) Patent No.: US 7,558,871 B2
(45) Date of Patent: *Jul. 7, 2009

(54) DATA STREAM ASSOCIATION WITH CALL THROUGH EMPLOYMENT OF IDENTIFIER WITHIN MESSAGE ASSOCIATED WITH THE CALL

(75) Inventors: Edward Alan Clark, Sugar Grove, IL (US); Stuart O. Goldman, Scottsdale, AZ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1192 days.

This patent is subject to a terminal disclaimer.

(21) Appl. No.: 10/698,573

(22) Filed: Oct. 31, 2003

(65) Prior Publication Data
US 2005/0094791 A1 May 5, 2005

(51) Int. Cl.
G06F 15/16 (2006.01)
(52) U.S. Cl. .................. 709/232; 709/203; 709/217
(58) Field of Classification Search .................. 709/203, 709/217–219, 230–232
See application file for complete search history.

(56) References Cited

U.S. PATENT DOCUMENTS 7,142,935 B2 * 11/2006 Janik .......................... 709/217
2001/0044850 A1 * 11/2001 Raz et al. .................... 709/231
2003/0084106 A1 * 5/2003 Erev et al. ................... 709/231

OTHER PUBLICATIONS

Public Switched Telephone Network, http://www.wikipedia.org/w/wiki.phtml?title=Public_switched_telephone_network&printabl, Aug. 29, 2003, pp. 1-2, St. Petersburg, USA.
Howe, Dennis, Public Switched Telephone Network, http://www.wombat.doc.ic.ac.uk/foldoc.cgi?PSTN, Aug. 29, 2003, p. 1, United Kingdom.
Dual-tone multi-frequency, http://www.wikipedia.org/w/wiki.phtml?title=Dual-tone_multi-frequency&printable=yes, Aug. 29, 2003, pages 1-2, St. Petersburg, USA.
CPE, http://www.techweb.com/encyclopedia/defineterm?term=CPE, Aug. 6, 2003, p. 1, Seattle, USA.
Section 1 Review, http://www.coste.com/CIE/Course/Section1/9.htm, pp. 1-2, Worcester, USA, Jan. 2003.
Session Initiation Protocol, http://searchnetworking.techtarget.com/sDefinition/0,,sid7_gci541639,00.html, Aug. 22, 2003, pp. 1-2, Needham, USA.
S, http://www.cisco.com/univercd/cc/td/doc/cisintwk/ita/s12.htm, Aug. 28, 2003, p. 15, San Jose, USA.
Bearer Independent Call Control, http://searchnetworking.techtarget.com/sDefinition/0,,sid7_gci775898,00.html, Oct. 20, 2003, pp. 1-2, Needham, USA.
Internet Protocol, http://searchnetworking.techtarget.com/sDefinition/0,,sid7_gci214031,00.html, Aug. 22, 2003, pp. 1-2, Needham, USA.
Cisco Systems, Inc, Integrated Services Digital Network, Oct. 28, 2003, pp. 12-1 to 12-8, Cisco Press, Indianapolis, USA.
Integrated Services Digital Network, http://www.wikipedia.org/w/wiki.phtml?title=Integrated_services_digital_network&printable, Aug. 29, 2003, pp. 1-3, St. Petersburg, USA.

* cited by examiner

Primary Examiner—Phuoc Nguyen (57) ABSTRACT

An apparatus in one example comprises an application server component that associates a data stream with a call through employment of an identifier within a message associated with the call.

17 Claims, 5 Drawing Sheets

DATA STREAM ASSOCIATION WITH CALL THROUGH EMPLOYMENT OF IDENTIFIER WITHIN MESSAGE ASSOCIATED WITH THE CALL

CROSS-REFERENCE TO RELATED APPLICATIONS

This application contains subject matter which is related to the subject matter of the following applications, which are assigned to the same assignee as this application. The below-listed applications are hereby incorporated herein by reference in their entireties:

"SERVICE(S) PROVIDED TO TELEPHONY DEVICE (S) THROUGH EMPLOYMENT OF DATA STREAM(S) ASSOCIATED WITH THE CALL," by Edward A. Clark, co-filed herewith.

"SERVICE(S) PROVIDED TO TELEPHONY DEVICE THROUGH EMPLOYMENT OF DATA STREAM(S) ASSOCIATED WITH CALL," by Edward A. Clark, co-filed herewith.

"TRANSMISSION OF USER INPUT(S) TO TELEPHONY DEVICE(S) THROUGH EMPLOYMENT OF DATA STREAM(S) ASSOCIATED WITH CALL," by Edward A. Clark, co-filed herewith.

TECHNICAL FIELD

The invention relates generally to telecommunications and more particularly to association of data to a call.

BACKGROUND

A user of Customer Premise Equipment ("CPE") initiates a call on a network. The CPE in one example comprises a telephony device. The CPE in one example employs a call request signaling, for example, a Dual Tone Multi Frequency ("DTMF") protocol, to initiate the call. The user of the CPE, for example, a calling CPE initiates the call to a called CPE. The network routes the call from the calling CPE to the called CPE.

For example, an application server component associated with the call provides one or more services to the called CPE. The services associated with the call in one example comprise a caller identification service. The application server component provides the called CPE with caller identification information, such as a calling party number associated with the calling CPE. The called CPE employs the caller identification information to display the calling party number of the calling CPE.

The application server component receives one or more messages associated with the call from the network. The messages associated with the call comprise information regarding the calling and/or called CPEs. The application server component provides the services based upon the information present in the messages associated with the call. The services provided by the application server component are limited to the information provided in the messages received from network elements, such as the application server component and/or a switch component, associated with the call. As one shortcoming, the restriction of the services provided by the application server component to the information provided in the messages undesirably limits the types of services provided to the users of the CPEs.

Thus, a need exists to provide one or more services that are not limited to the information present in the one or more messages received from the network.

SUMMARY

The invention in one embodiment encompasses an apparatus. An application server component associates a data stream with a call through employment of an identifier within a message associated with the call.

Another embodiment of the invention encompasses a method. A data stream is associated with a call is established through employment of an identifier within a message associated with the call.

Yet another embodiment of the invention encompasses an article. The article comprises one or more computer-readable signal-bearing media. The article comprises means in the one or more media for establishing a data stream associated with a call through employment of an identifier within a message associated with the call.

DESCRIPTION OF THE DRAWINGS

Features of exemplary implementations of the invention will become apparent from the description, the claims, and the accompanying drawings in which:

DETAILED DESCRIPTION

Figure 1:
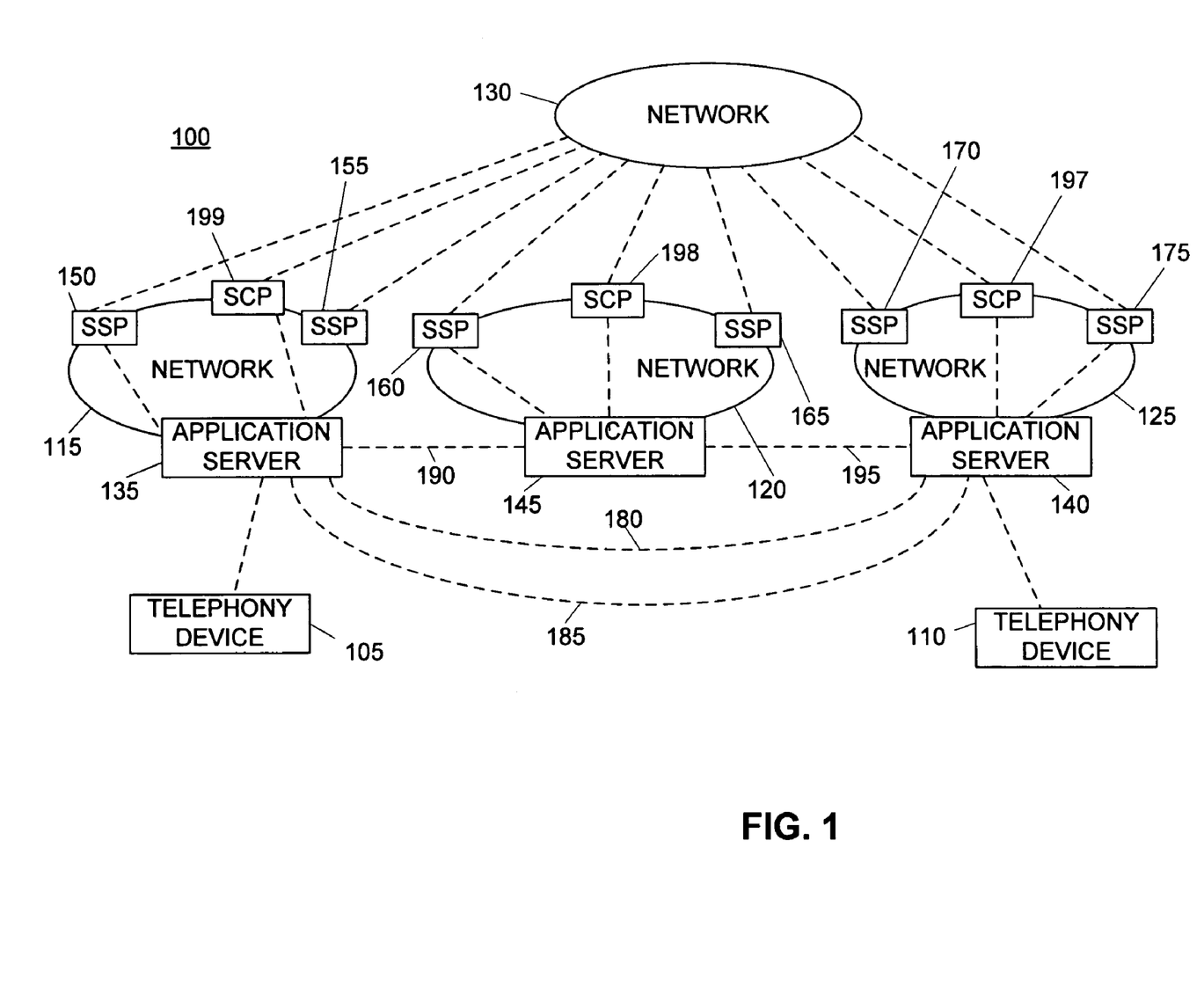
FIG. 1 is a representation of one exemplary implementation of an apparatus that comprises one or more application server components, one or more switch components, one or more telephony devices, and one or more networks.

Turning to FIG. 1, an apparatus 100 in one example comprises one or more telephony devices 105 and 110, and one or more networks 115, 120, 125, and 130. The telephony devices 105 and 110 in one example comprise one or more Customer Premise Equipments ("CPEs"), such as a computer, a web-enabled device, and/or a telephone. The telephony devices 105 and 110 initiate and/or receive one or more calls. In one example, the telephony device 105 initiates a call to the telephony device 110. In another example, the telephony device 105 receives a call initiated by the telephony device 110.

The telephony devices 105 and 110 initiate calls through employment of call request signaling. The call request signaling in one example comprises a Dual-Tone Multi-Frequency ("DTMF") or Touch Tone signaling, as will be understood by those skilled in the art. The telephony device 105 and 110 initiate calls on the networks 115, 120, 125, and/or 130.

The networks 115, 120, and 125 in one example comprise one or more service provider networks. In one example, the networks 115, 120, and 125 comprise a Public Switched Telephony Network ("PSTN") and/or an Integrated Services Digital Network ("ISDN"). The network 130 in one example comprises a signaling network, for example, a Signaling System 7 ("SS7") network. The networks 115, 120, 125, and 130 in one example comprise one or more application server components 135, 140, and 145 and one or more switch components 150, 155, 160, 165, 170, and 175, and one or more service control components 197, 198, and 199.

One or more of the networks 115, 120, 125, and 130 communicate with one or more other of the networks 115, 120, 125, and/or 130 through employment of one or more call control protocols. The one or more call control protocols in one example comprises an Integrated Services Digital Network User Part ("ISUP") protocol, the Session Initiation Protocol ("SIP"), the Bearer Independent Call Control ("BICC") protocol, and the Transaction Capabilities Application Part ("TCAP") protocol. The networks 115, 120, 125, and/or 130 establish calls from the telephony device 105 to the telephony device 110.

The application server components 135, 140, and/or 145 comprise one or more application servers. One or more of the application server components 135, 140, and/or 145 communicate with one or more other of the application server components 135, 140, and/or 145 through employment of one or more data stream control protocols. The data stream control protocols in one example comprise one or more of: the User Datagram Protocol ("UDP"), the Transfer Control Protocol ("TCP"), and the Session Initiation Protocol ("SIP").

One or more of the application server components 135, 140, and/or 145 communicate with one or more of the one or more switch components 150, 155, 160, 165, 170, and/or 175 through employment of one or more service control protocols. The service control protocol in one example comprises the Session Initiation Protocol ("SIP"). The application server components 135, 140, and 145 in one example communicate with the switch components 150, 175, and 160, respectively.

The switch components 150, 155, 160, 165, 170, and 175 in one example comprise one or more telephony switches, for example, one or more Service Switching Points ("SSPs"). The switch components 150, 155, 160, 165, 170, and/or 175 communicate with the telephony devices 105 and/or 110 through employment of the call request signaling. The switch components 150, 155, 160, 165, 170, and/or 175 communicate with one or more of the switch components 150, 155, 160, 165, 170, and/or 175 through employment of one or more of the one or more call control protocols. The switch components 150, 155, 160, 165, 170, and/or 175 communicate with one or more of the service control components 197, 198, and/or 199 through employment of one or more of the call control protocols.

The service control components 197, 198, and/or 199 in one example comprise one or more Intelligent Network/Advanced Intelligent Network platforms, for example, one or more Service Control Points ("SCPs"). The service control components 197, 198, and/or 199 employ one or more messages 502 (FIG. 5), for example, one or more query messages to communicate with one or more of the switch components 150, 155, 160, 165, 170, and/or 175.

Figure 5:
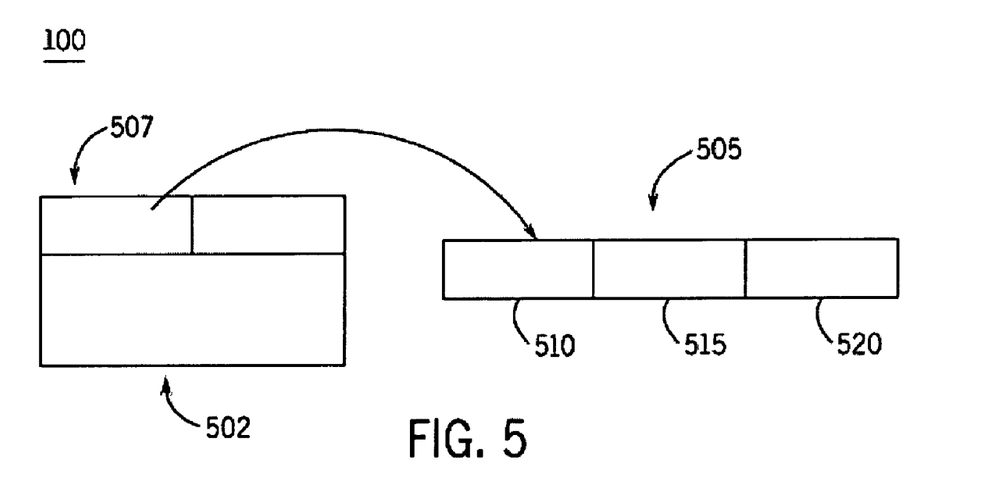
FIG. 5 is a representation of an exemplary message employed in establishment of the data stream by the application server component and the switch component of the apparatus of FIG. 1.

In one example, the switch components 150, 155, 160, 165, 170, and/or 175 employ one or more messages 502, for example, one or more initiation messages, to establish calls. In another example, the switch components 150, 155, 160, 165, 170, and/or 175 employ one or more messages 602 (FIG. 6), for example, one or more request-back messages, to establish calls. The messages 502 and the messages 602 in one example conform to the call control protocol.

The application server components 135, 140, and/or 145 establish one or more data streams, for example, data streams 180, 185, 190, and/or 195 with one or more of the application server components 135, 140, and/or 145. The application server components 135, 140, and/or 145 associate the data streams 180, 185, 190, and/or 195 with calls. The application server components 135, 140, and/or 145 employ one or more of the data streams 180, 185, 190, and/or 195 to provide one or more services for calls.

Figure 6:
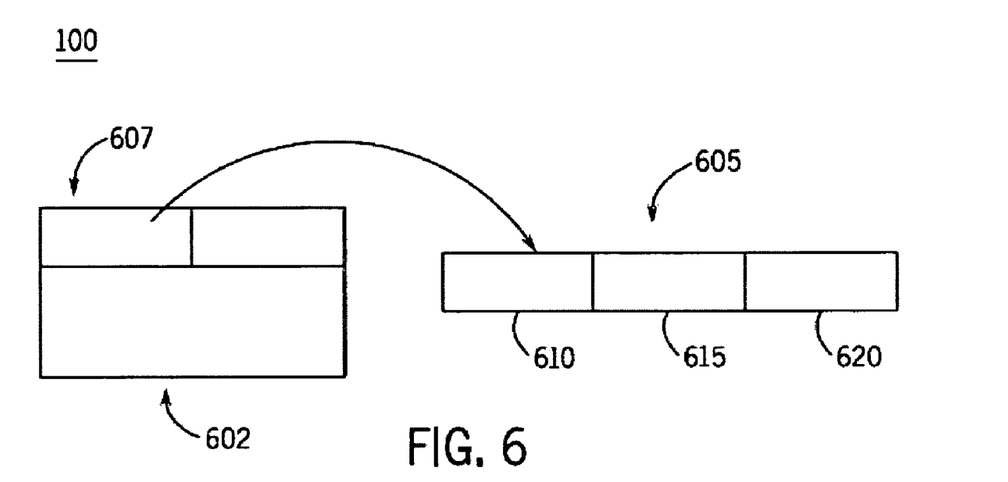
FIG. 6 is a representation of another exemplary message employed in establishment of the data stream by the application server component and the switch component of the apparatus of FIG. 1.
Figure 7:
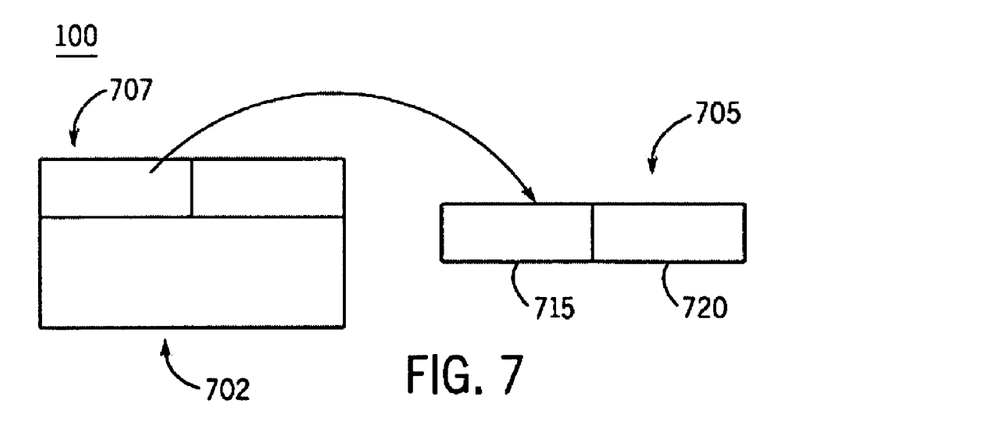
FIG. 7 is a representation of yet another exemplary message employed in establishment of the data stream by the application server component and the switch component of the apparatus of FIG. 1.

The application server components 135, 140, and/or 145 establish the data streams 180, 185, 190, and/or 195 through employment of one or more identifiers 505 (FIG. 5), 605 (FIG. 6) and/or 705 (FIG. 7). The application server components 135, 140, and/or 145 employ the identifiers 505, 605, and/or 705 to associate the data stream with a call.

An identifier 505 in one example comprises a network address 510, a port 515, and an identification tag 520. The network address 510 in one example comprises an Internet Protocol ("IP") address associated with one of the application server components 135, 140, and/or 145. The port 515 comprises a port number, for example, port 8080, associated with one of the application server components 135, 140, and/or 145. The port 515 in one example is associated with the one or more services provided by the application server components 135, 140, and/or 145 for a call. The identification tag 520 serves to uniquely identify the call, as will be appreciated by those skilled in the art.

The application server components 135, 140, and/or 145 establish the data streams 180, 185, 190, and/or 195 through employment of one or more messages 702 (FIG. 7), for example, one or more data stream request messages. Wherein a message 702 comprises a data stream request message, the application server components 135, 140, and/or 145 provide a portion of the identifier 505 within the message 702. The message 702 conforms to one or more of the data stream control protocols.

Referring to FIGS. 5-7, the message 502 and 602 conform to the call control protocol. The message 702 conforms to the data stream request protocol. The messages 502, 602, and 702 comprise one or more generic parameters 507, 607, and 707. The generic parameters 507 and 607 in one example comprise one or more Generic Address Parameters ("GAPs").

The message 502 in one example comprises the initiation message. The message 502 comprises the generic parameter 507. The generic parameter 507 in one example comprises the identifier 505. The switch component 150 and the application server component 135 in one example provide the identifier 505 within the generic parameter 507.

The message 602 in one example comprises a request-back message. The message 602 comprises the generic parameter 607. The generic parameter 607 in one example comprises the identifier 605. The identifier 605 in one example comprises a network address 610, a port 615, and an identification tag 620.

The message 702 in one example comprises a data stream request message. The message 702 comprises a portion of an identifier, for example, the identifier 505, within the generic parameter 707 of the message 702. The generic parameter 707 comprises a port 715 and an identification tag 720. In one example, the port 715 comprises the port 515 or 615. In another example, the identification tag 720 comprises the identification tag 520 or 620. The application server component 135 in one example routes the message 702 to a network address 710.

For example, the network address 710, the port 715, and the identification tag 720 comprise the network address 510, the port 515, and the identification tag 520. In another example, the network address 710, the port 715, and the identification tag 720 comprise the network address 610, the port 615, and the identification tag 620.

The application server components 135, 140, and/or 145 associate a call with the identifiers 505 of a plurality of identifiers 505 and/or identifier 605 of a plurality of identifier 605. The application server components 135, 140, and/or 145 in one example select the identifier 505 and/or 605 from the plurality of identifiers 505 and/or 605 such that the identifier 505 and/or 605 uniquely identifies the call.

For example, the application server component 135 selects a first identifier 505 to associate with a first call, and a second identifier 505 to associate with a second call. The application server component 135 distinguishes the first call from the second call through employment of the first identifier 505 and the second identifier 505, as will be appreciated by those skilled in the art.

In one example, the application server component 135 selects the identifier 505 and/or 605 from the plurality of identifiers 505 and/or 605 available for a call through employment of a random selection method. In another example, the application server component 135 employs a static selection method to select the identifier 505 and/or 605.

In yet another example, the application server component 135 employs a priority selection method to select the identifier 505 and/or 605. In still yet another example, the application server component 135 selects the identifier 505 and/or 605 based on information associated with a call provided by the switch component 150.

For example, where the application server component 135 selects the identifier 505, the application server component 135 selects: the network address 510 of a plurality of network addresses 510 associated with the application server component 135; the port 515 of a plurality of ports 515 associated with the application server component 135; and the identification tag 520 of a plurality of identification tags 520 associated with the application server component 135.

In another example, the application server component 140 associates the identifier 505 with a call through employment of the message 502, for example, the initiation message. For example, the message 502 associated with the call comprises the identifier 505. Upon receipt of the message 502, the switch component 175 communicates with the application server component 140 to provide the identifier 505 to the application server component 140. The application server component 140 stores the identifier 505.

The application server components 135, 140, and/or 145 in one example associate the data streams 180, 185, 190, and/or 195 with calls through employment of the identifiers 505 and/or 605. The application server components 135, 140, and/or 145 in one example employ the identifier 505 to distinguish the data stream 180 associated with one call from another data stream 185 associated with another call.

For example, the application server component 135 associates the first call with the first identifier 505. The application server components 135 and 140 cooperate to establish the data stream 180 associated with the first call. The application server component 135 associates the second call with the second identifier 505. The application server components 135 and 140 cooperate to establish the data stream 185 associated with the second call. The application server component 135 employs the first identifier 505 and the second identifier 505 to distinguish the data stream 180 associated with the first call from the data stream 185 associated with the second call.

In one example, the application server components 135, 140, and/or 145 provide the one or more services through employment of the data streams 180, 185, 190, and/or 195. In another example, the application server components 135 and 140 in one example cooperate through employment of the data stream 180 to update the one or more services provided to the telephony device 110. In another example, the application server components 135, 140, and/or 145 transfer data related to the one or more services through employment of the data streams 180, 185, 190, and/or 195. The application server components 135, 140, and/or 145 employ the data to provide the one or more services to the telephony devices 105 and 110.

In one example, the application server components 135, 140, and/or 145 employ the data to form one or more interfaces associated with the one or more services. For example, the application server component 135 transfers data to form a first interface to the application server component 140. The application server component 140 transfers data to form a second interface to the application server component 135.

The interfaces in one example comprise one or more eXtended Markup Language ("XML") interfaces. The application server components 135, 140, and/or 145 in one example provide the interfaces to the telephony device 105 and/or 110. The application server components 135, 140, and/or 145 employ one or more internet protocols such as HyperText Transfer Protocol ("HTTP") to provide the interfaces to the telephony devices 105 and/or 110.

The application server components 135, 140, and/or 145 in one example provide the one or more services on a call-by-call basis through employment of the identifier 505. The application server components 135, 140, and/or 145 employ the identifier 505 to distinguish a first one or more services associated with the first call from a second one or more services associated with the second call. For example, the application server component 135 employs the first identifier 505 to provide the first one or more services through employment of the data stream 180. The application server component 135 employs the second identifier 505 to provide the second one or more services through employment of the data stream 185.

In one example, one or more of the switch components 150, 155, 160, 165, 170, and/or 175 cooperate to establish a call. In another example, one or more of the switch components 150, 155, 160, 165, 170, and/or 175 and one or more of the service control components 197, 198, and/or 199 cooperate to establish a call. The switch components 150, 155, 160, 165, 170, and/or 175 provide the identifier within the messages 502 and/or 602 associated with a call. In one example, the switch components 150, 155, 160, 165, 170, and/or 175 associate the call with the identifier 505 and/or 605. In another example, the service control components 197, 198, and/or 199 associate the call with the identifier 505 and/or 605. The switch components 150, 155, 160, 165, 170, and/or 175 cooperate with the application server components 135, 140, and/or 145 to provide the one or more services for the respective calls.

The switch components 150, 155, 160, 165, 170, and/or 175 establish a call through employment of the message 502, for example, the initiation message, and/or the message 602, for example, the request-back message. The Integrated Services Digital Network User Part protocol comprises the message 502, for example, an Initial Address Message ("IAM"), and the message 602, for example, a Call ProGress ("CPG") message.

The switch components 150, 155, 160, 165, 170, and/or 175 provide the identifier 505 within the message 502 and/or the identifier 605 within the message 602 associated with a call. In one example, the switch component 150 inserts the identifier 505 into the generic parameter 507 of the message 502. In another example, switch component 175 inserts the identifier 605 into the generic parameter 607 of the message 602.

For example, the switch component 150 is pre-provisioned to communicate with the application server component 135 upon receipt of the message 502, and/or message 602, where the message 502 comprises the initiation message, and/or the message 602 comprises the request-back message. The switch component 150 provides the identifier 505 from within the message 502 and/or the message 602 to the application server component 135. In another example, the switch component 175 is pre-provisioned to communicate with the application server component 140 to obtain the identifier 505 upon sending of the message 502 and/or the message 602 from the switch component 175.

The message 502, for example, the initiation message, is received by the switch component 175. Where the message 502 omits the identifier 505, the switch component 175 communicates with the application server component 140 to obtain the identifier 605. The switch component 175 inserts the identifier 605 into the message 602, for example, the request-back message. The switch component 175 sends the message 602 to the switch component 150.

The switch components 150, 155, 160, 165, 170, and/or 175 associate the identifier 505 with a call. The switch components 150, 155, 160, 165, 170, and/or 175 associate the identifier 505 with the call through employment of the message 502. For example, the switch component 150 associates the identifier 505 with the call established by the message 502 through employment of the message 502.

Where a user of the telephony device 110 establishes the call, the switch components 150, 155, 160, 165, 170, and/or 175 cooperate with the application server components 135, 140, and/or 145 to provide the one or more services for the call. For example, the application server components 135 and 140 cooperate to provide the one or more services associated with the call to the telephony devices 105 and 110. Where a user of the telephony device 110 interacts with the call, for example, through a touch-tone selection, the application server component 140 and the switch component 175 cooperate to update the one or more services associated with the call through employment of the identifier 505 and/or 605.

For example, the switch component 175 plays a voice prompt to the telephony device 110. The application server components 135 and 140 cooperate to transfer data related to billing information about the telephony device 110. Where the telephony device 110 terminates the call, the application server components 135 and 140 cooperate to record the billing information for the telephony device 110. In one example, the switch components 150 and 175 and the application server components 135 and 140 cooperate to update the voice prompt based on the billing information. In another example, the switch components 150 and 175 and the application server components 135 and 140 cooperate to update the billing information based upon a response from a user to the voice prompt.

In another example, the user of the telephony device 110 performs one or more interactions with the interfaces provided by the application server component 140. The application server component 140 employs the identifier 505 associated with the call to communicate an interaction to the switch component 175. The switch component 175 employs the identifier 505 to update the call. For example, the switch component 175 mutes the user of the telephony device 110 on the call.

An illustrative description of exemplary operation of the apparatus 100 is presented, for explanatory purposes.

Figure 2:
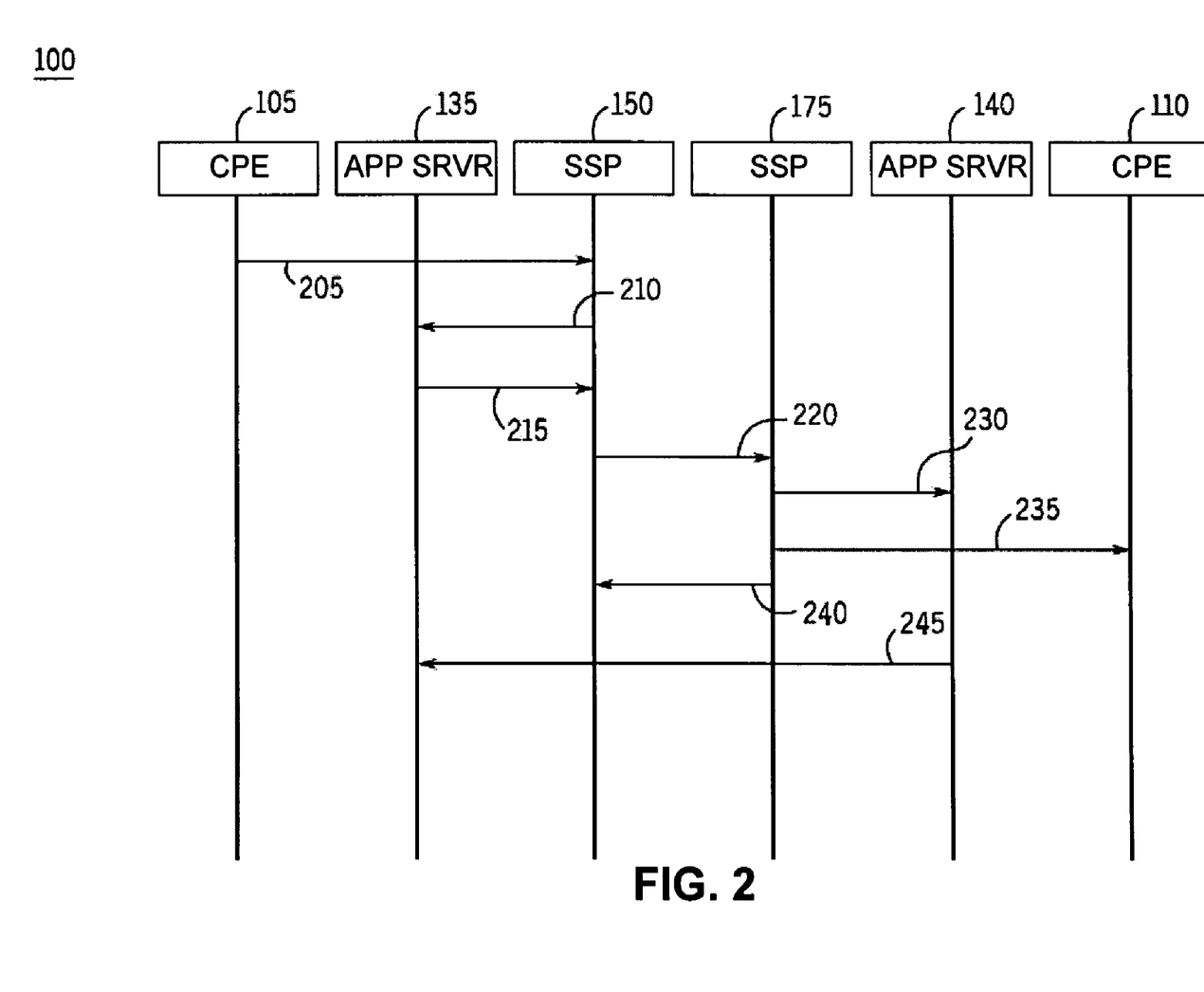
FIG. 2 is a representation of an exemplary process flow of an establishment of a data stream between a first application server component and a second application server component of the apparatus of FIG. 1.

Turning to FIG. 2, a user of the telephony device 105 initiates a call to the telephony device 110. The switch component 150 is pre-provisioned to communicate with the application server component 135. The switch component 175 is pre-provisioned to communicate with the application server component 140 upon receipt of the message 502, for example, the initiation message. In STEP 205, the telephony device 105 dials a number, for example, a called party number, to initiate the call to the switch component 150.

In STEP 210, the switch component 150 communicates with the application server component 135 (e.g., through employment of a SUBCRIBE message) to obtain the identifier 505. The application server component 135 selects the identifier 505 and provides the identifier 505 to the switch component 150. In STEP 215, the application server component 135 returns the identifier 505 to the switch component 150 through employment of a NOTIFY message.

In STEP 220, the switch component 150 sends the message 502, for example, the initiation message (e.g., the Initial Address Message), to the switch component 175. The networks 115, 120, 125, and/or 130 routes the message 502 to the switch component 175 via the network 130. In STEP 230, the switch component 175 communicates with the application server component 140 to provide the identifier 505 to the application server component 140.

In STEP 235, the switch component 175 forwards the call to the telephony device 110 through employment of line signaling (e.g., power ringing). In STEP 240, the switch component 175 indicates call delivery with a message, for example, an ANSI Address Complete Message ("ACM"), to the switch component 150 via the network 130. In STEP 245, the application server component 140 initiates the message 702, for example, the data stream request message, to the application server component 135 through employment of the identifier 505. The application server components 135 and 140 establish the data stream 180 associated with the call.

Figure 3:
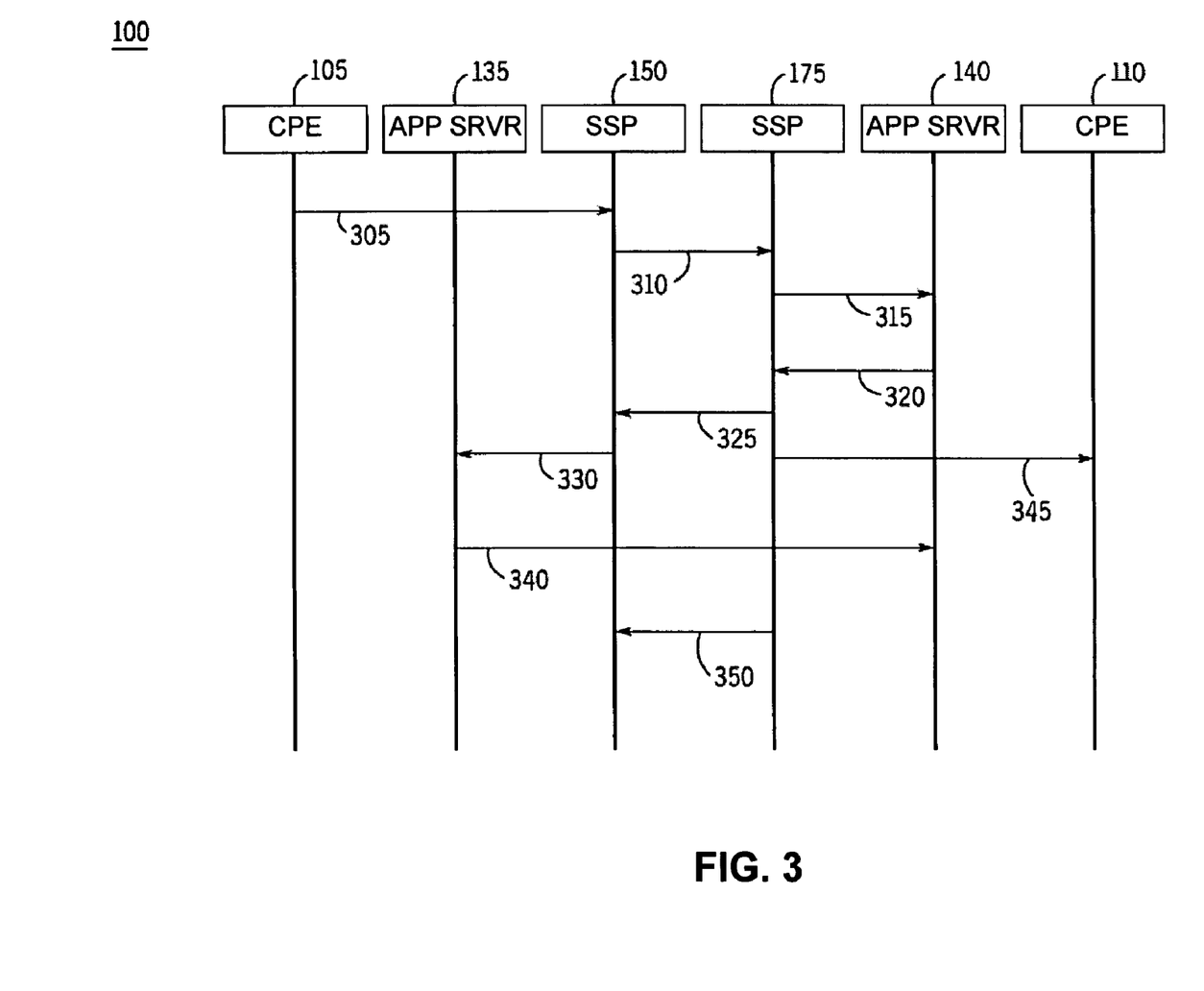
FIG. 3 is a representation of another exemplary process flow of an establishment of a data stream between a first application server component and a second application server component of the apparatus of FIG. 1.

Turning to FIG. 3, in STEP 305 the telephony device 105 initiates the call to the switch component 150. In STEP 310, the switch component 150 sends the message 502, for example, the initiation message, to the switch component 175 via the networks 115, 120, 125, and/or 130. The message 502 omits the identifier 505.

The switch component 175 is pre-provisioned to communicate with the application server component 140 upon receipt of the message 502, where the message 502 comprises the initiation message. In STEP 315, the switch component 175 initiates the SUBSCRIBE message to communicate with the application server component 140.

In STEP 320, the application server component 140 selects the identifier 605. The identifier 605 comprises the network address 610, the port 615, and the identification tag 620 associated with the application server 140. The application server component 140 associates the identifier 605 with the call. The application server component 140 provides the identifier 605 to the switch component 175.

In STEP 325, the switch component 175 initiates the message 602, for example, the request-back message (e.g., Call ProGress message), to the switch component 150. In STEP 330, the switch component 150 initiates the NOTIFY message to provide the identifier 605 to the application server component 135. In STEP 340, the application server component 135 initiates the message 702 (e.g., the data stream request message) to the application server component 140 through employment of the identifier 605. The application server components 135 and 140 establish the data stream 185 associated with the call.

In STEP 345, the switch component 175 forwards the call to the telephony device 110. In STEP 350, the switch component 175 indicates the delivery of the call to the telephony device 110 with an address complete message to the switch component 150.

Figure 4:
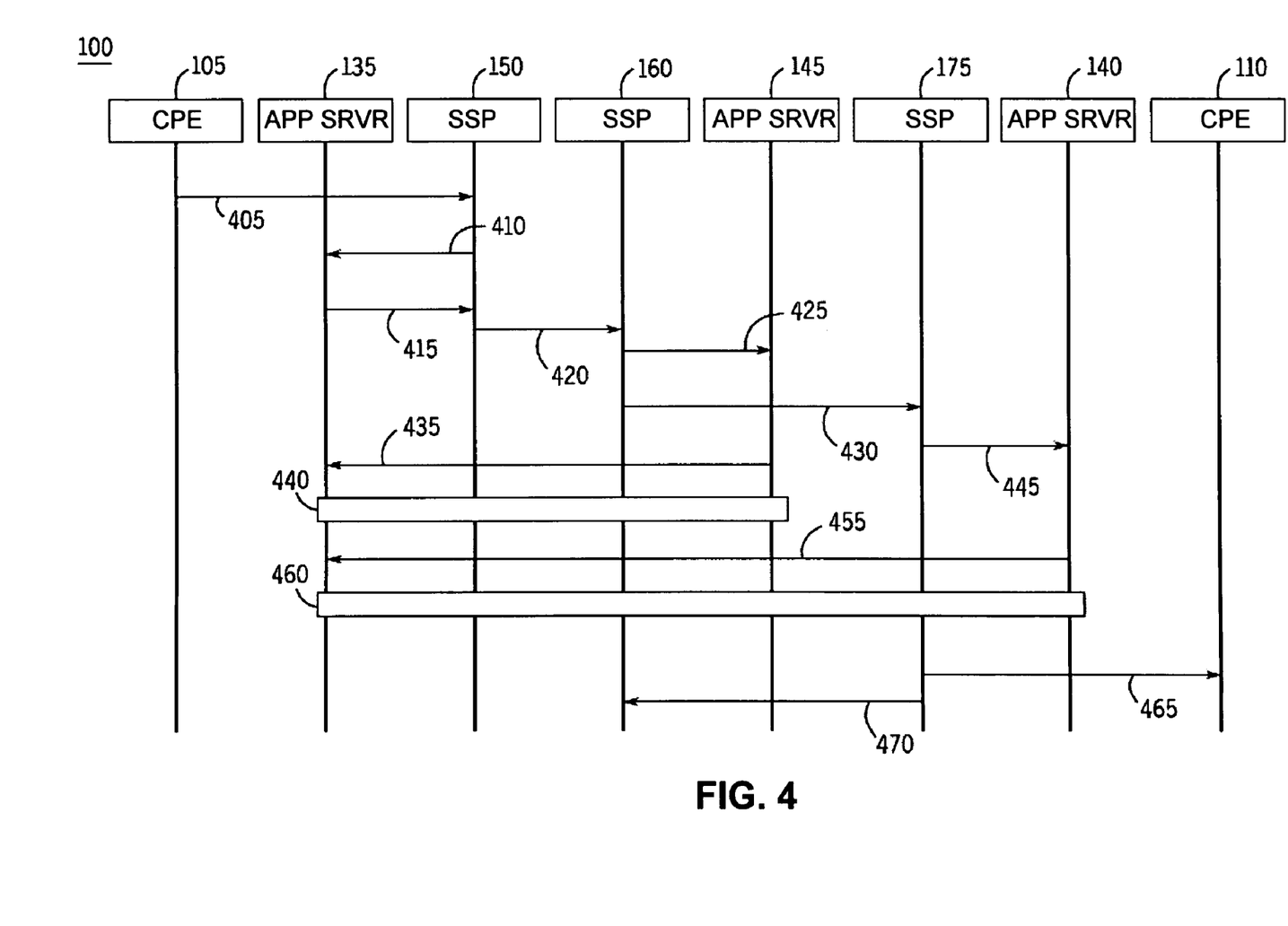
FIG. 4 is a representation of an exemplary process flow of an establishment of multiple data streams with a first application server component of the apparatus of FIG. 1.

Turning to FIG. 4, the application server component 135 establishes the data stream 180 with the application server component 140 and the data stream 190 with the application server component 145.

In STEP 405, the user of the telephony device 105 initiates a call to the switch component 150. In STEP 410, the switch component 150 communicates with the application server component 135 to obtain the identifier 505 associated with the call.

In STEP 415, the application server component 135 associates the identifier 505 with the call and returns the identifier 505 to the switch component 150. In STEP 420, the switch component 150 routes the message 502, for example, the initiation message, to the switch component 160. The switch component 160 is pre-provisioned to communicate with the application server component 145 upon receipt of the message 502, where the message 502 comprises the initiation message.

In STEP 425, the switch component 160 employs the service control protocol to provide the identifier 505 to the application server component 145. In STEP 430, the switch component 160 forwards the message 502, for example, the initiation message, to the switch component 175.

In STEP 435, the application server component 145 initiates a first message 702, for example, a first data stream request message, to the application server component 135 addressed by the network address 510 of the identifier 505. In STEP 440, the application server component 135 establishes the data stream 190 with the application server component 145.

In STEP 445, the switch component 175 provides the identifier 505 to the application server component 140. In STEP 455, the application server component 140 initiates a second message 702, for example, a second data stream request message, to the application server component 135. In STEP 460, the application server component 135 establishes the data stream 180 with the application server component 140.

In STEP 465, the switch component 175 routes the call to the telephony device 110. In STEP 470, the switch component 175 sends the address complete message to the switch component 160.

The apparatus 100 in one example comprises a plurality of components such as computer software and/or hardware components. A number of such components can be combined or divided in the apparatus 100. For example, the application server component 135 may be combined with the switch component 150. An exemplary component of the apparatus 100 employs and/or comprises a set and/or series of computer instructions written in or implemented with any of a number of programming languages, as will be appreciated by those skilled in the art.

The apparatus 100 employs at least one computer-readable signal-bearing medium. One example of a computer-readable signal-bearing medium for the apparatus 100 comprises an instance of a recordable data storage medium such as one or more of a magnetic, electrical, optical, biological, and atomic data storage medium. The recordable data storage medium in one example comprises the storage device 101. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a first application server component and a first switch component of a first network;
   a second application server component and a second switch component of a second network;
   wherein the first application server component, first switch component, second application server component, and second switch component cooperate to route a call between the first network and the second network;
   wherein the first application server component sends a message with an identifier for the first application server to the second application server through the first and second switch components;
   wherein the first and second application server components cooperate to create a data stream through employment of the identifier;
   wherein the first and second application server components associate the data stream with the call through employment of the identifier.

2. The apparatus of claim 1, wherein the first application server component employs the identifier to associate one or more available services with the data stream;
   wherein the first application server component employs the data stream to provide one or more services, of the one or more available services.

3. The apparatus of claim 2, wherein the first application server component associates the one or more services with the call through employment of the identifier.

4. The apparatus of claim 1, wherein the first application server component selects the identifier from a plurality of available identifiers;
   wherein the first application server component associates the identifier with the call.

5. The apparatus of claim 4, wherein the data stream comprises a first data stream, wherein the call comprises a first call, wherein the identifier comprises a first identifier of the plurality of available identifiers;
   wherein the first application server component selects the first identifier and a second identifier from the plurality of available identifiers;
   wherein the first application server component employs the second identifier to associate a second data stream with a second call.

6. The apparatus of claim 4, wherein upon termination of the data stream, the first application server component returns the identifier to the plurality of available identifiers.

7. The apparatus of claim 1, wherein the first application server component provides the identifier to the first switch component.

8. The apparatus of claim 7, wherein the first switch component communicates with the first application server component to obtain the identifier.

9. The apparatus of claim 1, wherein the second application server component receives the identifier from the second switch component.

10. The apparatus of claim 9, wherein the second switch component communicates with the second application server component to provide the identifier to the second application server component.

11. The apparatus of claim 9, wherein the second application server component employs the identifier to establish the data stream.

12. The apparatus of claim 1, wherein the second switch component cooperates with the second application server component to provide one or more services of one or more available services through employment of the data stream.

13. The apparatus of claim 12, wherein the second switch component establishes the call;
   wherein the second switch component cooperates with the second application server component to update the call based on the one or more services.

14. The apparatus of claim 1, wherein the call is placed from the first network to the second network;
   wherein the message comprises an initial address message (IAM).

15. The apparatus of claim 1, wherein the call is placed from the second network to the first network;
   wherein the message comprises a call progress (CPG) message.

16. A method, comprising the step of:
   sending a message to establish a call from a first switch component of a first network to a second switch component of a second network, wherein the message comprises an identifier of a first application server component of the first network;
   sending the identifier to a second application server component of the second network;
   establishing a data stream between the first and second application server components, wherein the first and second application server components associate the data stream with the call through employment of the identifier within the message.

17. The method of claim 16, wherein the message conforms to a first signaling protocol, wherein the data stream conforms to a second signaling protocol, wherein the step of establishing the data stream comprises the steps of:
   establishing the call through employment of the message; and
   establishing the data stream through employment of the second signaling protocol.

* * * * *